March 26, 1957   E. W. MERRILL   2,786,233
APPARATUS FOR MAKING BATTERY SEPARATORS
Filed Jan. 12, 1953   2 Sheets-Sheet 1
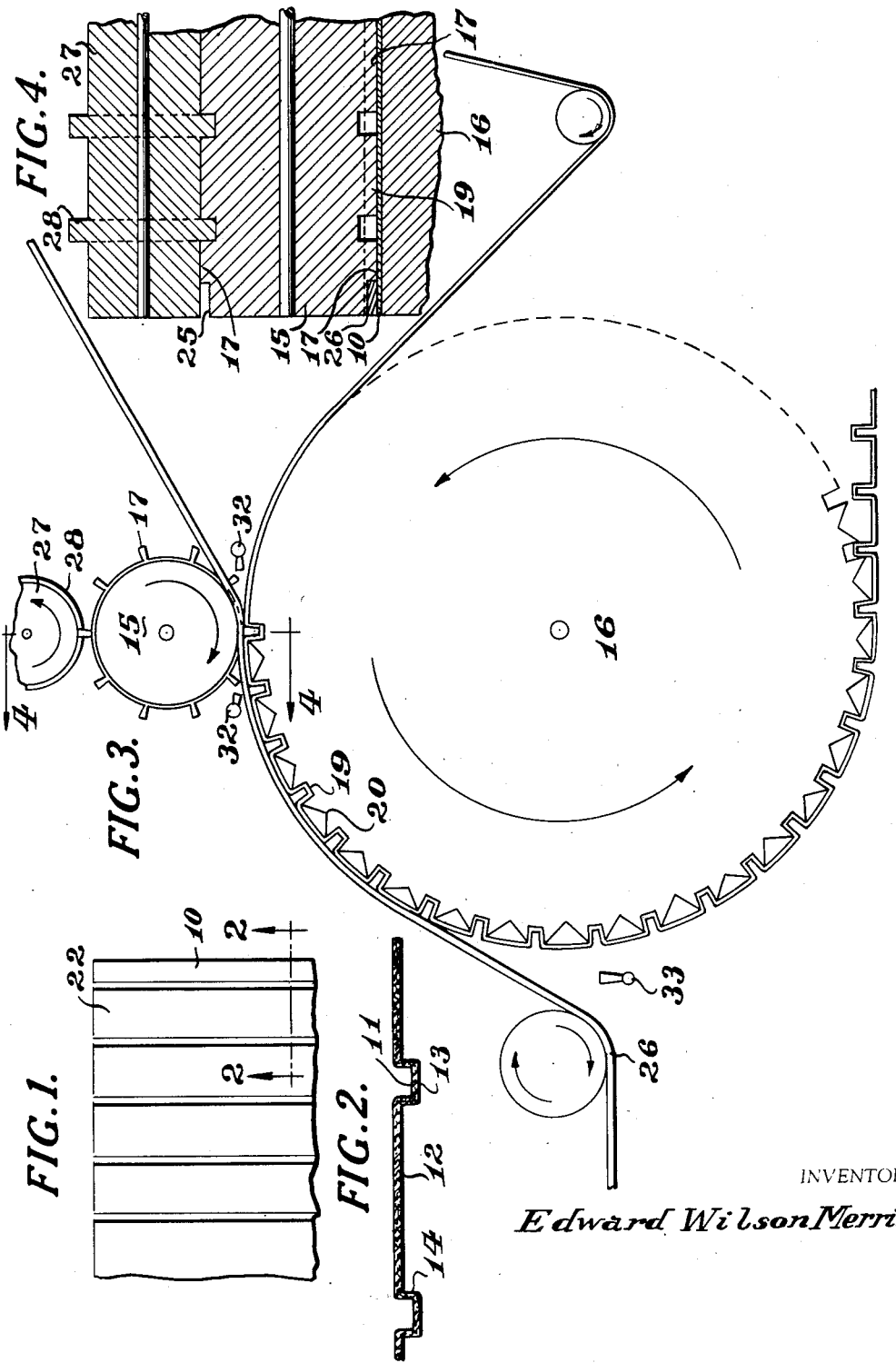
INVENTOR
Edward Wilson Merrill March 26, 1957  E. W. MERRILL  2,786,233
APPARATUS FOR MAKING BATTERY SEPARATORS
Filed Jan. 12, 1953  2 Sheets-Sheet 2
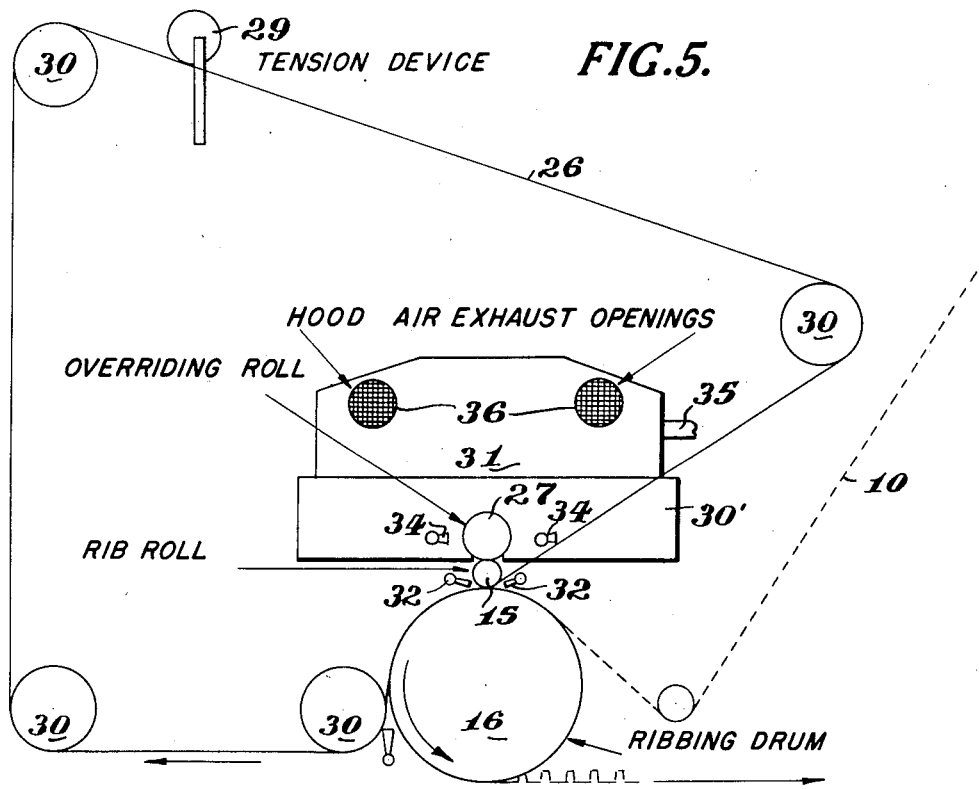
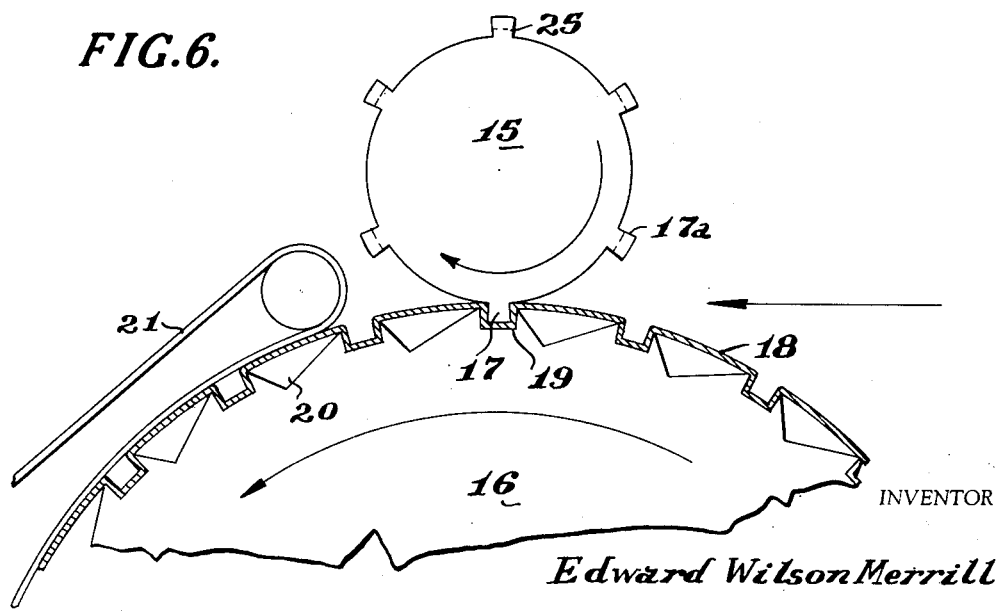
INVENTOR
*Edward Wilson Merrill*

United States Patent Office 2,786,233
Patented Mar. 26, 1957

2,786,233

APPARATUS FOR MAKING BATTERY SEPARATORS

Edward Wilson Merrill, Cambridge, Mass., assignor to W. R. Grace & Co., Norwalk, Conn., a corporation of Connecticut Application January 12, 1953, Serial No. 330,760

8 Claims. (Cl. 18—10)

This invention relates to the manufacture of battery separators of the resin impregnated, felted fibre type described in my copending application Serial No. 155,294, filed April 11, 1950 and its division and continuation in part, Serial No. 276,950 filed March 17, 1952 (now Patents 2,687,445 and 2,626,429, respectively) to which this application is a continuation-in-part.

Particularly, this invention is concerned with an apparatus for producing spaced hollow stable ribs in a resin impregnated fibre web by forming the ribs and partially curing the rib portions while leaving the areas between the ribs or projections relatively uncured.

Furthermore, the invention is concerned with an apparatus for forming each of the hollow ribs of a definite and uniform contour, i. e., with substantially vertical, straight, spaced side walls which extend at a right angle or converge at a slight inclination towards each other with respect to the body of the separator and are joined by a top portion which is likewise somewhat flattened and connects the vertical spaced walls of each hollow rib at approximately a right angle.

In addition, this invention relates to an apparatus in which a continuous flat resin impregnated fibrous web or webs of definite length may be formed with uniform spacer ribs or projections in uniform spaced relation and of the desired contour in a very efficient and rapid manner and wherein the ribs will permanently maintain substantially their original formation.

Referring to the drawings:

Figure 1 is a top elevation of an improved battery separator, partly broken away.

Figure 2 is a section on the line 2—2 of Figure 1.

Figure 3 is a diagrammatic view of one form of rib producing apparatus.

Figure 4 is a section on the line 4—4 of Figure 3.

Figure 5 is a diagrammatic view more completely showing the apparatus illustrated in Figures 3 and 4, and Figure 6 is a view of a modification, similar to that described in Figure 3 of my aforementioned application.

Referring to Figure 1, the separator 10 is adapted for use in a standard automotive type of starting battery. The ribs 11 are raised from the sheet areas 12 as is more clearly shown in Figure 2. The top 13 of each rib is somewhat flattened as shown and joins the vertical wall areas 14 of the hollow rib at substantially right angles and the vertical walls 14 join the sheet areas 12 at substantially a right angle, all as shown in Figure 2.

A full description of the separators and the process of their manufacture appears in patents which issued on the parent application and will not be repeated here, since this application is confined to certain features of the separator forming machine.

After the web has been impregnated and dried as described in Patent No. 2,626,429, it is run through one of the web forming machines diagrammatically indicated in Figures 3–6. The original machine is shown in Figure 6. It operates on a narrow web in an entirely satisfactory manner. When it is desired to run webs having a width greater than the height of one separator, the improvements illustrated in Figures 1–5 are advantageous. The machine illustrated in Figure 6 consists of a bank of two rolls 15 and 16. The bed roll 16 is of considerable diameter, for the ribs of the separator are cured in the slots cut across its face. A large diameter is necessary to allow the time of contact necessary for cure to take place. The rib-forming roll 15 on the other hand has quite a small diameter. Its maximum size is determined by the spacing of the ribs, but if the cutting or pulling apart of the web is to be avoided, it is essential that only one of the transverse ribbing bars 17 which extend across the face of the roll 15 shall touch the web 18 at any one time. The radius of the ribbing roll 15, therefore, must be so small that an adjacent ribbing bar 17a is not tangent to the bed roll at any time that the preceding ribbing bar 17 is engaging the slot 19 cut in the bed roll 16.

Many of the suitable resins are condensation polymers and when they polymerize release water. When such resins are used, it is quite necessary that all web-contacting parts of the rib-forming apparatus be maintained above the boiling point of water and to get a sufficiently rapid cure preferably be heated to a temperature of about 350° F. If the temperature is less than 212° F., the water released in the condensation reaction will condense and form water spots which, in turn, produce erratic electrical characteristics.

By referring to Figure 6, it will be noticed that there is a wide inclined slot 20 cut in the face of the bed roll 16 between each rib-forming slot 19 etc. The floor of the slot 20 lies at an angle of about 15° to the tangent of the bed roll and merges with the normal periphery of the roll just in advance of the succeeding rib-forming slot. Consequently, as the impregnated web material is fed between the rolls, the web is pushed by the ribbing bar 17 into the rib-forming slot 19 of the bed roll; and since the rolls are heated well above the curing temperature of the resin, the resin in the newly formed rib portions immediately begins to cure. The resin in the so-called "current carrying" areas does not cure to any substantial degree, because the inclined slot 20 keeps the web wholly out of contact with a heated surface. To hold the web in the slots for a sufficient time to cure the resin, a series of bars 21 is positioned just beyond the periphery of the bed roll. Clearance between the bars 21 and the bed roll 16 is only that which will allow the web 18 to fit between them. The deformed portions (ribs) 11 of the web which have been pushed into rib-forming slots of the bed roll consequently stay in position on the bed roll during a major part of its revolution. Thus, the web, despite its inherent springy nature, is held in the rib-forming slots until it reaches the take-off point, not shown, where the web leaves the bed roll. At this time, it will be found that the phenolic resin contained in that part of the web which has been distorted to form a rib is polymerized substantially to the "C" or the infusible stage. As a result, the dimensions which have been imposed on the rib by the rib-forming operation are permanent, and no significant dimensional change takes place in the separators after the rib leaves the bed roll.

The apparatus illustrated in Figure 6 was designed to rib webs which are narrow and operates in a highly successful manner, particularly if the face of the bedroll be about a foot in width. It became necessary, however, in order to meet production demands to make the face of the bed and ribbing rolls much wider so that 40- or 50-inch-wide webs could be run and then to cut separators to specification size from the ribbed and cured web as one of the final steps of the process. To run wide webs, a number of improvements illustrated in Figures 3–5 were found to be desirable (a) to avoid springing of the ribbing roll which is of small diameter and (b) to clear away the polymerizable vapors which were released in such volume by a wide web that sticky deposits built up on the machine.

Referring to Figures 3 and 4, the projections 17 are provided at spaced points with circumferential channels 25 which allow the hold-down tapes 26 to more readily pass between the rib roll 15 and the ribbing drum 16 as shown in Figure 3, particularly.

Also, an overriding roll 27 is provided which prevents the ribbing roll 15 from distorting when pressed against the ribbing drum 16, particularly when the ribbing roll 15 is mounted to rotate as an idler roll, it being understood that the roll 15 may be geared to rotate with the ribbing drum 16 or be simply an idler roll rotated by the rotation of the ribbing drum and the engagement of the projections 17 in the grooves 19. In this connection, the hold-down or overriding roll 27 is provided with circumferential flanges 28 which engage in the grooves 25 of the ribs 17, so as to assure that there will be no distortion of the ribbing roll 15 when it is pressed into engagement with the heated ribbing drum 16.

Referring to Figure 5, there are provided a multiplicity of hold-down tapes 26 in the form of continuous metal bands, i. e., a series of spaced hold-down tapes similar to the bars 21 which serve to hold the web 10 in the slots for a sufficient time to cure the resin in the rib portions. A suitable tension device 29 of any desired character may be employed to control the tension of the spaced continuous hold-down bands 26 which move over suitable rollers indicated as a whole at 30 and anyone of which is positively driven, as desired, the bands moving in the spaced grooves 25.

The condensation polymerization of the resin in the paper is accompanied by the splitting out of water, which as has been explained should not be allowed to condense, drip back, and form water spots. It is also accompanied by the distillation out of the paper of a small percentage of lower molecular weight, relatively volatile fractions of the resinoid. For the present purpose, it is sufficient to suppose that the steam and low molecular weight constituents of the resinoid exist in the gas phase just over the paper. These condense and, once condensed into the liquid phase, exist in such high concentration and under such favorable temperature conditions that further inter-reaction is inevitable.

Ultimately, solid resin, sticky semi-solid material, and viscous liquids will appear on various parts of the ribbing apparatus as the machine continues its operation. Then the machine would have to be stopped and cleaned, were it not for the scavenging apparatus illustrated in Figure 5.

Referring to Figure 5 again, it will be noted that the overriding roll 27 is enclosed by baffles 30 which form a chamber above the ribbing roll 15, which chamber 30 communicates with a superposed chamber 31. Also, it will be observed that jets 32 are located as shown in Figures 3 and 5 at the nip between the ribbing roll and the ribbing drum and also at the point of take-off of the hold-down tapes 26 from the ribbing drum as shown at 33. Also, similar steam jets 34 are located in the chamber 30. Through these jets 32, 33, 34 superheated steam or a hot gas is directed upon opposite sides of the nip between the ribbing roll and ribbing drum, in the bight between the take-off of the tapes 26 from the ribbing drum 16 and play upon the overriding roller 27. The purpose of the gas jets at these points is to sweep condensable resinoids away from the ribbing apparatus. Superheated steam is preferred for simplicity and convenience. Air or other hot (240° F.) high velocity gas will also sweep the condensable vapors into the exhaust hood and away from the machine parts. Thus, sticky and ultimately hard encrustations and build-ups are avoided.

Referring again to Figure 5, warm dry air is introduced into the chamber 31 at 35 from any suitable source of supply and exhausted from the chamber 31 through air exhaust openings 36 by means of a suitable blower, not shown, whereby a gentle suction is created which does not interfere with the turbulence created by the superheated steam jets 32 or 34, but which is strong enough to constantly withdraw any reactive vapors as well as moisture rising from about the nip 32 into the chambers 30 and 31 as well as from the overriding roll 27.

Therefore, it is possible to operate the machine at a high rate of production with the assurance that the web 10 will be uniformly ribbed and will be free of sticky areas or spots which would mar its usefulness. Moreover, the machine can be run at high speed without fear that the spaced metallic hold-down tapes will collect fibres from the surface of the web or tear the fibres by reason of sticking of the web to the tapes. Furthermore, both the surface of the ribbing roll 15 and the projections thereon and the surface of the overriding roll 27 and the projections thereon will be kept free of sticky accumulation or deposits or hard cured encrustations.

Referring to Figure 6 and to Figure 3, it will be observed that the V-shaped longitudinally extending slots 20 in Figure 3 have their V-shaped sides of equal dimension, as distinguished from the V-shaped slots of Figure 6, which have their advance sides of longer dimensions. The construction shown in Figure 3 in which the longitudinally extending slots on the ribbing drum 16 are V-shaped and equal sided allows the web to be passed through the machine satisfactorily in either direction, i. e., the drum 16 may be rotated in either direction.

As a result of the improvements above recited, continuous webs of felted material made of paper fibres or paper fibres mixed with glass fibres and impregnated with a suitable resin, for example, a phenolic resin in the A stage, can be passed at high speed through the apparatus described with the assurance that the ribs will be of uniform structure and that the body of the web will likewise not be marred by accumulation of resin at various speeds which would interfere with electrolyte permeation.

The rolls 15, 16 and 27 are rotated in any conventional manner, and a strip material 10 is fed with the hold-down tapes or wires 26 between the rolls 15 and 16, as best illustrated in Figure 5. The ribbing bars 17 press spaced transverse areas of the strip material passing between the rotating rolls 15 and 16 into the rib-forming slots 19, the tapes 26 at this point passing through the slots 25 in the ribbing bars 17, as shown in Figures 3 and 4.

As explained above, the bed roll is provided with peripheral, longitudinally extending, spaced, rib-forming slots 19 and the rib-forming roll 15 is formed with peripheral, longitudinally extending, spaced ribbing bars or projections 17. The peripheral slots 20 in the bed roll extend longitudinally thereof and are disposed in the spaces between the rib-forming slots 19 and comprehend the transverse peripheral area of the bed roll substantially between the walls of the rib-forming slots.

While I have illustrated the steam nozzles for supplying superheated steam upon opposite sides of the nip between the rolls 15 and 16 and at the point where the hold-down tapes leave the bed roll 16 and have also shown the steam nozzles directed upon the overriding roll 27, it is to be understood that as many steam jets may be provided as necessary to preclude condensation of vapors and build up of chemical compounds and reaction products upon the machine.

I claim:

1. An apparatus of the class described comprising means for feeding strip material to be formed with transverse ribs, a rib-forming roll and a bed roll, means for rotating said rolls, and means for heating the bed roll, said bed roll having peripheral, longitudinally extending, spaced rib-forming slots and longitudinally extending peripheral slots disposed in the spaces between the rib-forming slots, the latter said slots comprehending substantially the transverse, peripheral area of the bed roll between the walls of the rib-forming slots, said rib-forming roll having peripheral, longitudinally extending, spaced ribbing bars arranged to cooperate with the bed roll and to press spaced transverse areas of strip material passing between the rotating rolls into said rib-forming slots, the radius of the rib-forming roll being so small with respect to the radius of the bed roll that only one ribbing bar will touch the strip material at any one time and an adjacent ribbing bar is not tangent to the bed roll at any time that a preceding ribbing bar is engaging in a slot in the bed roll.

2. An apparatus according to claim 1 having hold-down means consisting of a series of spaced metal tapes engaging the strip material while it passes over said bed roll and wherein said ribbing bars are provided with slots through which said tapes extend when a ribbing bar engages in a rib-forming slot.

3. An apparatus according to claim 1 comprising an overriding roll superposed upon said rib-forming roll, and inter-engaging means on said overriding roll and said rib-forming roll for preventing distortion of the latter when one of the ribbing bars is engaging in one of the rib-forming slots.

4. An apparatus according to claim 3 wherein said inter-engaging means comprises projections on the overriding roll engaging in grooves in the ribbing bars.

5. An apparatus according to claim 1 wherein means are provided at the point of inter-engagement of the rib-forming and bed rolls for preventing condensation of and build up of chemical reactants, said means comprising jets for injecting steam under pressure into the nip between the bed roll and the rib-forming roll on opposite sides of said nip.

6. An apparatus according to claim 5 having hold-down tapes engaging strip material passing over said bed roll, and a jet for directing steam in the angle between the periphery of the bed roll and said hold-down tapes at the point where said tapes leave the periphery of the bed roll.

7. An apparatus according to claim 1 comprising an overriding roll superposed upon said rib-forming roll, and inter-engaging means on said overriding roll and said rib-forming roll for preventing distortion of the latter when one of the ribbing bars is engaging in one of the rib-forming slots, and jets for directing steam upon said overriding roll to prevent the deposit and accumulation of condensates and chemical compounds thereon.

8. An apparatus according to claim 7 wherein said overriding roll is substantially enclosed by a chamber, and means disposed remote from said steam jets for withdrawing gases and vapors away from said overriding roll and from said chamber.

References Cited in the file of this patent

UNITED STATES PATENTS

| | | |
|---|---|---|
| 1,159,812 | Tucker | Nov. 9, 1915 |
| 1,784,906 | Oxhandler | Dec. 16, 1930 |
| 1,920,109 | Ruegenberg | July 25, 1933 |
| 1,954,635 | Leonard | Apr. 10, 1934 |
| 1,967,726 | Sherman | July 24, 1934 |
| 2,041,356 | Kraft | May 19, 1936 |
| 2,303,554 | Humphreys | Dec. 1, 1942 |
| 2,497,212 | Donofrio | Feb. 14, 1950 |
| 2,526,318 | Battin | Oct. 17, 1950 |
| 2,532,080 | Benbow | Nov. 28, 1950 |